United States Patent [19]
Freund et al.

[11] Patent Number: 5,135,198
[45] Date of Patent: Aug. 4, 1992

[54] EXTERNALLY ADJUSTABLE FLOW RESTRICTION CONTROL FOR POPPET VALVES

[75] Inventors: Melvin A. Freund, Newark; James J. Krannitz; Larry E. Purcell, both of Lancaster, all of Ohio

[73] Assignee: The Babcock & Wilcox Co., New Orleans, La.

[21] Appl. No.: 707,847

[22] Filed: May 30, 1991

[51] Int. Cl.$^5$ .......................... F16K 1/52; F16K 31/52
[52] U.S. Cl. ...................................... 251/121; 251/240
[58] Field of Search ........................ 251/121, 240, 241

[56] References Cited

U.S. PATENT DOCUMENTS

| | | |
|---|---|---|
| 1,978,730 | 10/1934 | Weber . |
| 3,425,451 | 2/1969 | Smith . |
| 3,472,479 | 10/1969 | Sherwood ..................... 251/121 X |
| 3,490,379 | 1/1970 | Laing . |

FOREIGN PATENT DOCUMENTS 1565768 4/1980 United Kingdom .

OTHER PUBLICATIONS

Atwood & Morrill Co., Inc., Advertisement.

Primary Examiner—Arnold Rosenthal
Attorney, Agent, or Firm—Harness, Dickey & Pierce

[57] ABSTRACT

An externally adjustable restriction control assembly for a poppet valve. The restriction control assembly is actuated through rotation of the valve stem. Upon rotation of the valve stem, a restriction control disc, threadably mounted to the valve stem guide, is moved toward or away from a seat provided within the housing. Movement of the restriction control disc thereby adjusts the effective cross-sectional flow area through the valve.

19 Claims, 1 Drawing Sheet

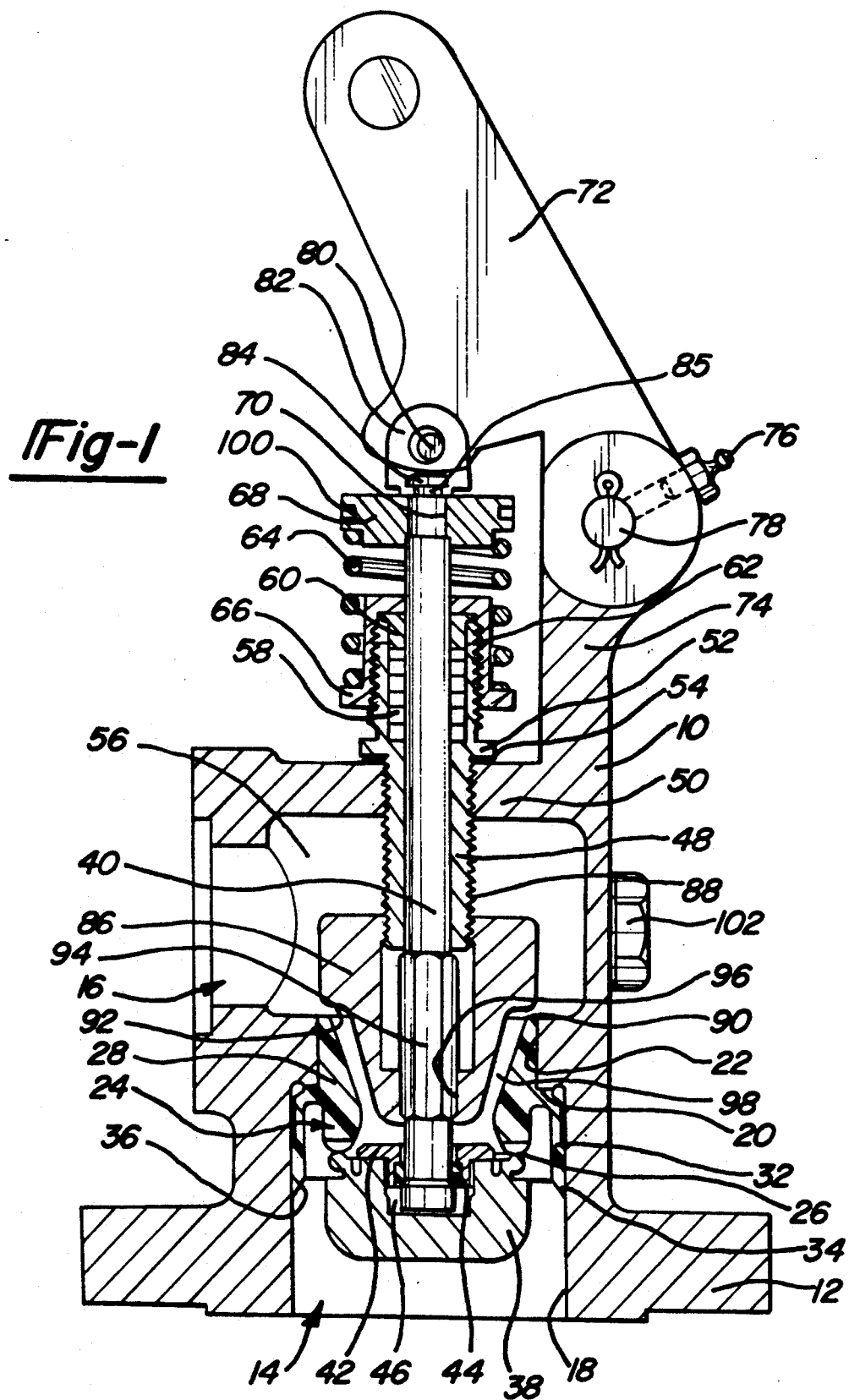

EXTERNALLY ADJUSTABLE FLOW RESTRICTION CONTROL FOR POPPET VALVES

BACKGROUND AND SUMMARY OF THE INVENTION

This invention relates generally to fluid flow control valves and more particularly to poppet valves for use on a sootblower device and having means for externally adjusting the flow restriction through the valve.

Sootblowers are typically used with large scale boilers for discharging a cleaning medium which provides a thermal and mechanical shock to dislodge combustion and flue gas deposits forming on the heat transfer surface of the boiler. In this manner the efficiency of the boiler can be maintained.

Generally, poppet valves are utilized with sootblowers to control the discharge of a cleaning medium, such as air, water or steam, from a source into a lance element which directs the cleaning medium toward the surfaces to be cleaned.

A widely used flow control valve used in sootblower applications is a poppet type valve having an internal flow restriction control disc. In one popular valve of this type, the restriction control disc is threaded onto the valve stem guide. To adjust the flow restriction of the valve, a access plug is removed from the body of the valve. The restriction control disc is peripherally notched so that when the plug is removed, the disc may be turned by pushing or prying with a small bar or screwdriver so as to rotate it along the threads of the valve stem guide. As the restriction control disc moves along the threads, the effective flow area between the restriction control disc and the valve seat is varied. A poppet valve of this particular type is illustrated in U.S. Pat. No. 3,164,364 which is commonly assigned to the Assignee of the present application.

The space which houses the restriction control disc in the above mentioned type of poppet valve is limited. Also, a substantial period of time is required to remove the access plug, adjust the restriction control disc, and replace the access plug. Thus any adjustment of the valve restriction will result in a significant sootblower down time.

A more convenient restriction adjustment mechanism for a poppet valve, both in terms of ease of operation and accessibility, is disclosed in U.K. Patent No. 1,565,768, which is also commonly assigned to the Assignee of the present application.

In the U.K. patent, a poppet valve is provided with a internal restriction control disc which is threaded onto the stem guide for movement toward and away from a secondary valve seat. The restriction control disc is provided with a toothed periphery which meshes with a worm gear journaled within the body of the valve. The worm gear is externally driven and when the worm gear is rotated, the restriction control valve is also rotated and moves toward or away from the valve seat, thereby adjusting the effective flow area of the valve.

The present invention represents and advancement of fluid flow control valves having an externally adjustable restriction feature. A primary object of this invention is to provide improved regulation of the flow restriction, while also improving the actuation mechanism so as to provide for a more convenient restriction adjustment.

A poppet valve embodying the principles of the present invention includes a valving mechanism which is typical of those used in the industry in that it includes a valve head which is movable from a closed position in contact with a valve seat and an open position in which the valve head is spaced from the valve seat. The valve head is actuated by a valve stem extending through the body. Normally, the valve system is biased by a spring so as to hold the valve head in its closed position. A pivotable trigger operates on the valve stem so as to compress the spring member, axially move the valve stem and displace the valve head from the valve seat thereby opening the poppet valve.

The externally adjustable restriction control assembly of the present invention cooperates with the valve stem and another seat which encircles the inlet port and faces interiorly of the chamber. A threaded stem guide is fixed to the valve body and extends into the chamber toward the seat. A portion of the valve stem, interior of the chamber, includes a driver surface around which is mounted a restriction control disc. The restriction control disc is engaged with the driver portion such that it is rotationally fixed therewith but axially movable relative thereto. The restriction control disc is also threadably engaged with the screw portion. That portion of the valve stem which is external of the valve body includes a portion which can be utilized to rotate the valve stem.

By rotating the valve stem, the restriction control disc is rotated and moved axially along the threaded engagement of the screw portion toward or away from the seat thereby effectively altering the flow gap between the seat and the restriction control disc.

Additional benefits and advantages of the present invention will become apparent to those skilled in the art to which this invention relates from the subsequent description of the preferred embodiment and the appended claims, taken in conjunction with the accompanying drawing.

BRIEF DESCRIPTION OF THE DRAWING

FIG. 1 is a longitudinal section view of a sootblower steam valve embodying the externally adjustable restriction control assembly of the present invention.

DETAILED DESCRIPTION OF THE PREFERRED EMBODIMENT

Now with reference to the drawing, the present invention is illustrated in FIG. 1 in an environment in which it finds particularly utility. The restriction control assembly of the present invention is illustrated in a sootblower steam valve, of the poppet valve type, having a body or housing 10, a mounting flange 12, an inlet aperture or port 14, and an outlet aperture or port 16 adapted for connection to an inlet portion of the sootblowing device (not shown). The inlet port 14 generally includes an annular wall 18 having a radially inward annular shoulder 20 and a second annular wall 22 having a smaller diameter than annular wall 18.

Mounted within the annular wall 18 and 22 and the annular shoulder 20, is a valve seat member 24 which is further provided with a hardened valve seat surface 26 constructed of a material well known within the industry. Extending into that portion of the inlet port 14 which is defined by the annular wall 22, is a main body portion 28 of the valve seat member 24. An annular shoulder 30 is adapted to abut the annular shoulder 20 formed in the housing 10 and extends from the main body portion 28 of the valve seat member 24. A relatively flexible portion 32 extends through most of its length in a spaced relation from the annular wall 18 until terminating in another outwardly directed shoulder 34. The shoulder 34 is secured by welding at 36, or other suitable manner, to fixedly position the valve seat member 24 within the inlet port 14.

A valve head 38 is secured to the lower end of a valve stem 40 by means of a retainer nut 42 which is slidable over the valve stem 40 and threaded into the valve head 38 itself. A retainer bushing 44 is utilized to mount the retainer nut 42 over the valve stem 40 while a gap 46 is provided around the terminal end of the valve stem 40 to permit the valve head 3 to slightly tilt relative to the valve stem 40. In this manner, the valve head 38 can slightly tilt without binding on the valve stem 40 thereby compensating for any discrepancies in alignment between the valve seat surface 26 and the valve head 38 and permitting the valve head 38 to seat evenly on the valve seat surface 26.

The valve stem 40 is supported by and slidable within a sleeve-like stem guide 48 which is also threadably engaged into an upper wall 50 of the housing 10. The stem guide 48 includes a mounting flange 52, positioned over a washer 54, which prevents over insertion of the stem guide 48 into an interior chamber 56 defined within the housing 10. Packing material 58 is urged into sealing engagement with the valve stem 40 in a exterior pocket formed by the stem guide 48 and retained therein by a packing washer 60 and a packing nut 62 which is threadably received o the outer end of the stem guide 48.

A valve spring 64 encircles the valve stem 48. One end of the valve spring 64 engages a flange 66 formed on the packing nut 62 and the other end engages a spring retainer 68. By adjusting the threaded engagement between the packing nut 62 and the exterior end of the stem guide 48, the force exerted by the valve spring 64, which is transferred to the valve head 38, and the seating surface 26, can be adjusted.

The spring retainer 68 is maintained on the valve stem 40 in a manner which prevents relative rotation therebetween. Such an engagement is achieved by providing corresponding interlocking surfaces 70 around the respective contacting portions of the spring retainer 68 and the valve stem 40. As a skilled artisan will appreciate, numerous mechanisms can be used to prevent relative rotation. In the present embodiment, valve stem 40, which is substantially cylindrical, is provided with flat sections in the area engaging the spring retainer 68. The aperture of the spring retainer 68 through which the valve stem 40 extends is correspondingly provided with flat sections. The interlocking of the adjacent flat and cylindrical sections readily and inexpensively prevent any rotation therebetween.

A trigger 72 is pivotally mounted to a riser 74 which is specifically provided for that purpose. A lubricant fitting 76 may be provided on the riser 74 to supply a lubricant, such as grease, to the pinned connection illustrated at 78. The trigger 72 is also pivotally connected at 80 to a yoke 82 which is rotatably engaged with the outer end of the valve stem 40 at a stop head 84. A snap ring (not shown) may be positioned in a groove 84 on the valve stem 40 to retain the yoke 82, and also the spring retainer 68, on the valve stem 40.

As seen from the figure and the above description, rotation of the trigger 72 in a counterclockwise direction will cause the valve stem 40 to move axially downwardly against the force of the valve spring 64. Movement of the valve stem 40 will cause the valve head 38 to disengage from the hardened valve seat surface 26 and permit steam to pass through the housing 10 to the sootblower.

A restriction control disc 86 is provided to afford an additional control over the pressure at which stem is provided to the sootblower. The restriction control disc 86 is adjustably threaded onto that portion of the stem guide 48 extending into the interior chamber 56. As such, the stem guide 48 is provided with external threads 88. By threadably mounting the restriction control disc 86 onto the stem guide 48, during rotation, a radially outwardly extending shoulder 92 of the restriction control disc 86 (and the restriction control disc 86 in general) is moved toward or away, depending upon the direction of rotation, from an upper seat 90 formed in the valve seat member 24.

To rotate the restriction control disc 86, that portion of the valve stem 40 which extends beyond the stem guide 48 is provided with a noncircular driver portion 94. The driver portion 94 is illustrated as being hexagonal in shape. However, other configurations are also possible. The restriction control disc 86 includes a correspondingly shaped driven portion 9 into which the driver portion 94 is received. The driver portion 94 somewhat smaller in size than the driven portion 96 so that the restriction control disc 86 is free to axially move relative to the valve stem 40 in response to rotation of the valve stem 40 and the engagement of the restriction control disc 86 with the threads 88 formed on the stem guide 48.

At a given position of the restriction control disc 86, an annular orifice 98 of given size is defined between the upper seat 90 and the restriction control disc 86. The size of the orifice 98 may be varied from a position of full restriction, in which the shoulder 92 of the restriction control disc 8 actually contacts the upper seat 90, to a position of least restriction where the restriction control disc 86 has been moved to its limit of travel away from the valve seat member 24.

To facilitate rotation of the valve stem 40, the spring retainer 68 is provided with a plurality of drive holes 100 to which a spanner wrench or similarly adapted tool may be attached and rotated. It should be noted that the invention is not intended to be so limited since any mechanism which imparts rotation to the valve stem 40 may be utilized in place of the drive holes 100 of the illustrated embodiment.

The housing 10 is additionally provided with an access plug 102. The access plug 102 may be removed to provide access to the interior chamber 56 for inspection, cleaning or maintenance of the restriction control disc 86.

While the above description illustrates only one commercially practical embodiment of the present invention, it will be appreciated that the principles of the invention have a broad range of application and are susceptible to modification, variation and change without departing from the proper scope and fair meaning of the accompanying claims.

We claim:
1. A valve apparatus for a sootblower comprising:
a valve body having a valve inlet and a valve outlet;
a valve seat located between said valve inlet and said valve outlet;
a poppet valve having a stem which extends outside said valve body and a valve element which seals against said valve seat to stop fluid flow through said valve body and can be displaced from said valve seat to allow fluid flow through said valve body;

a stem guide having a longitudinal bore for allowing said stem to pass through said stem guide, said stem guide being mounted to said valve body;

a restrictor member being positioned within said valve body and having a portion being engaged with said stem guide, said restrictor member also having a portion being engaged with said stem to prevent relative rotation therebetween, said restrictor member being movable between a position which decreases the cross-sectional flow area through said valve body to provide a relatively high restriction of fluid flow therethrough, to a position providing an increased cross-sectional flow area through said valve body providing a relatively low restriction of fluid through said valve body; and means for causing relative rotation between said stem guide and said restrictor member thereby changing the position of said restrictor member to alter the cross-sectional flow area through said valve body.

2. A valve apparatus for a sootblower as set forth in claim 1 further comprising biasing means for urging said poppet valve to a position of sealing said valve element against said valve seat.

3. A valve apparatus for a sootblower as set forth in claim 2 in which said biasing means includes a spring retainer disc for coupling said stem to a coil spring, said spring retainer disc being coupled to said stem to permit said spring retainer disc to rotationally drive said stem, and means for allowing said spring retainer disc to be rotated by a tool.

4. A valve apparatus for a sootblower as set forth in claim 1 wherein said stem guide defines a threaded generally cylindrical surface and said portion of said restrictor member defines a generally cylindrical threaded surface being engaged therewith.

5. An adjustable flow restriction control assembly for a fluid flow control valve inlcuding a body having an interior chamber in communication with both an inlet port and an outlet port, said flow restriction control assembly being actuatable externally of the body for adjustably controlling the restriction of fluid flow through the valve comprising:

valving means being movable for controlling fluid flow through the valve between the inlet port and the outlet port, said valving means including a movable stem extending exterior of the body and a portion interior of the body, said stem being movable longitudinally and rotationally;

a circumferential valve seat inside said chamber;

a guide member fixed relative to the body and extending into the interior chamber toward said seat, said guide member having a threaded screw portion formed thereon;

a flow restriction control member threadably engaging said screw portion and being movable alternately toward and away from said seat, said flow restriction control member further having a driven portion formed thereon;

a drive portion fixedly attached to said stem portion interior of said body and being movable therewith, said drive portion engaging said driven portion; and actuation means external of the body for rotating said stem thereby rotating said drive portion and causing said driven portion to rotate said flow restriction control member whereby said control member moves along said screw portion alternately toward and away from said seat portion thereby adjustably controlling the fluid flow restriction through the valve.

6. An adjustable flow restriction control assembly as set forth in claim 5 wherein said seat circumferentially encircles the inlet port.

7. An adjustable flow restriction control assembly as set forth in claim 5 wherein said guide member is a stem guide forming a coaxial sleeve around said stem.

8. An adjustable flow restriction control assembly as set forth in claim 5 wherein said threaded screw portion is formed as external threads on said guide member.

9. An adjustable flow restriction control assembly as set forth in claim 5, wherein said pressure control member further includes portions defining an aperture centrally therethrough.

10. An adjustable flow restriction control assembly as set forth in claim 9 wherein said stem extends through said aperture.

11. An adjustable flow restriction control assembly as set forth in claim 9 wherein said aperture includes a portion having internal threads formed thereon for engaging said threaded screw portion of said guide member.

12. An adjustable flow restriction control assembly as set forth in claim 5 wherein said driven portion is formed along a portion of said aperture.

13. An adjustable flow restriction control assembly as set forth in claim 5 wherein said drive portion has a non-circular configuration along its perimeter.

14. An adjustable flow restriction control assembly as set forth in claim 13 wherein said drive portion has a generally hexagonal configuration along its perimeter.

15. An adjustable flow restriction control assembly as set forth in claim 13 wherein said driven portion has a non-circular configuration substantially corresponding to said drive portion configuration and being larger than said drive portion configuration.

16. An adjustable flow restriction control assembly as set forth in claim 14 wherein said driven portion has a hexagonal configuration and being larger than said drive portion configuration.

17. An adjustable flow restriction control assembly as set forth in claim 10 wherein said drive portion is non-concentric in shape and extends through said aperture.

18. An adjustable flow restriction control assembly as set forth in claim 17 wherein said driven portion is formed along a portion of said aperture and generally corresponds in shape to said drive portion shape for rotating therewith, said driven portion shape being larger than said drive portion thereby permitting said drive portion to move longitudinally with said stem relative to said driven portion.

19. An adjustable flow restriction control assembly as set forth in claim 5 wherein said actuation means includes a retainer coupled to said stem for rotation therewith, said retainer having tool receiving means formed thereon for receiving a tool to impart rotation to said retainer and said stem.

* * * * *

UNITED STATES PATENT AND TRADEMARK OFFICE
CERTIFICATE OF CORRECTION

PATENT NO.    : 5,135,198
DATED         : August 4, 1992
INVENTOR(S)   : Melvin A. Freund et al It is certified that error appears in the above-identified patent and that said Letters Patent is hereby corrected as shown below:

Column 3, line 13, "3" should be --38--.

Column 3, line 27, "a" should be --an--.

Column 3, line 30, "o" should be --on--.

Column 4, line 24, "9" should be --96--.

Column 4, line 37, "8" should be --86--.

Column 5, line 19, claim 1, after "fluid" insert --flow--.

Column 5, line 43, Claim 5, "inlcuding" should be --including--.

Signed and Sealed this

Fifth Day of October, 1993

Attest:

BRUCE LEHMAN

*Attesting Officer*    *Commissioner of Patents and Trademarks*